(12) United States Patent
Sasaki et al.

(10) Patent No.: US 8,711,663 B1
(45) Date of Patent: Apr. 29, 2014

(54) PLASMON GENERATOR INCLUDES THREE METAL LAYERS FOR THERMALLY-ASSISTED MAGNETIC RECORDING

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/777,488

(22) Filed: Feb. 26, 2013

(51) Int. Cl.
*G11B 11/00* (2006.01)

(52) U.S. Cl.
USPC .................................... 369/13.33; 369/13.13

(58) Field of Classification Search
CPC ............... G11B 5/4866; G11B 2005/0021; G11B 2005/0024; G11B 2005/0032
USPC ................. 369/13.33, 13.13, 13.32, 13.17
See application file for complete search history.

(56) References Cited

U.S. PATENT DOCUMENTS

| | | | | |
|---|---|---|---|---|
| 8,264,920 B1 * | 9/2012 | Chou et al. | ................. | 369/13.33 |
| 8,456,968 B1 * | 6/2013 | Sasaki et al. | ............... | 369/13.33 |
| 8,509,038 B1 * | 8/2013 | Sasaki et al. | ............... | 369/13.33 |
| 2006/0274611 A1 * | 12/2006 | Challener | ................. | 369/13.33 |
| 2010/0215372 A1 * | 8/2010 | Kitazawa et al. | .......... | 369/13.33 |
| 2011/0170381 A1 | 7/2011 | Matsumoto | | |
| 2011/0222184 A1 * | 9/2011 | Komura et al. | ............ | 369/13.33 |
| 2012/0147716 A1 * | 6/2012 | Hara et al. | ................. | 369/13.33 |
| 2013/0033972 A1 * | 2/2013 | Hara et al. | ................. | 369/13.33 |
| 2013/0091695 A1 * | 4/2013 | Shimazawa et al. | ............ | 29/601 |
| 2013/0107681 A1 * | 5/2013 | Sasaki et al. | ............... | 369/13.33 |
| 2013/0148485 A1 * | 6/2013 | Jin et al. | ................... | 369/13.33 |

OTHER PUBLICATIONS

U.S. Appl. No. 14/069,883, filed Nov. 1, 2013 in the name of Yoshitaka Sasaki et al.

* cited by examiner

*Primary Examiner* — Tan X Dinh

(74) *Attorney, Agent, or Firm* — Oliff PLC

(57) ABSTRACT

A plasmon generator has a front end face located in a medium facing surface of a magnetic head. The plasmon generator includes a first layer formed of a first metal material, a second layer formed of a second metal material, and a third layer formed of a third metal material. Each of the second and third layers has an end portion constituting part of the front end face. The first layer does not have any portion constituting part of the front end face. The first and second metal materials are higher in electrical conductivity than the third metal material. The third metal material is higher in Vickers hardness than the first and second metal materials. The first layer has a plasmon exciting part.

10 Claims, 14 Drawing Sheets

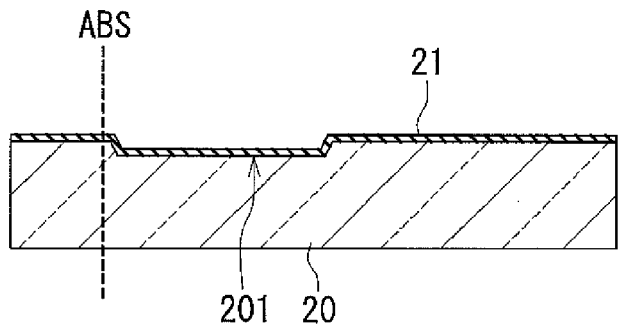
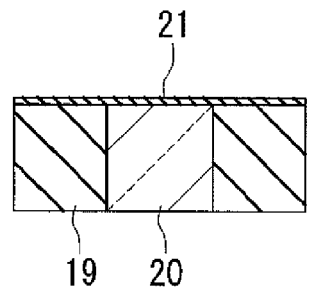
FIG. 7A  FIG. 7B
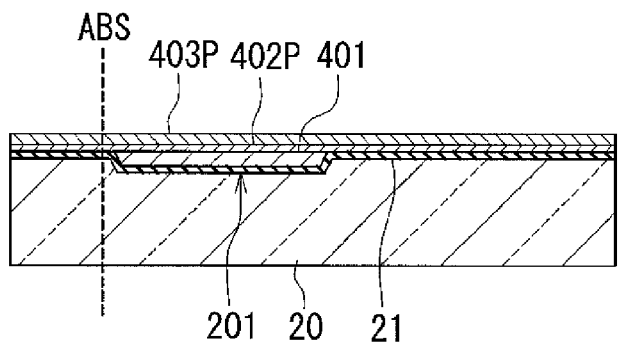
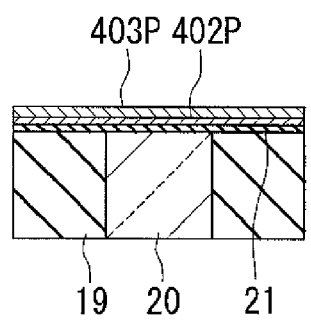
FIG. 8A  FIG. 8B
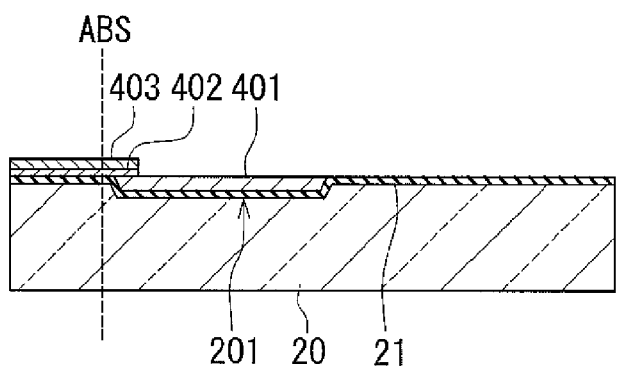
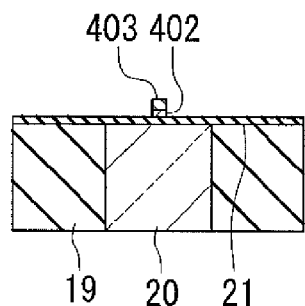
FIG. 9A  FIG. 9B

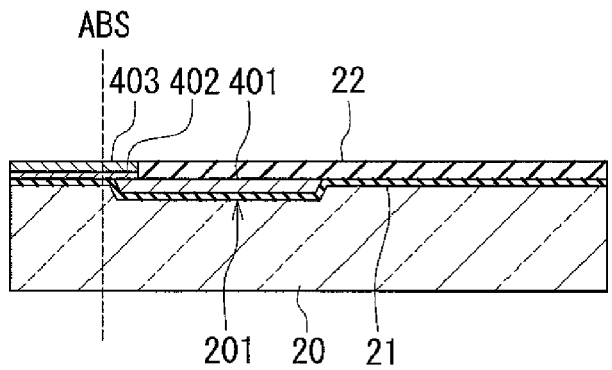
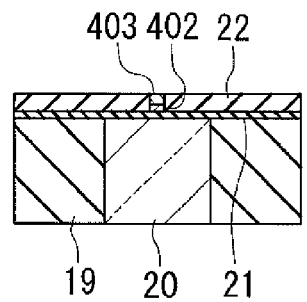
FIG. 10A
FIG. 10B
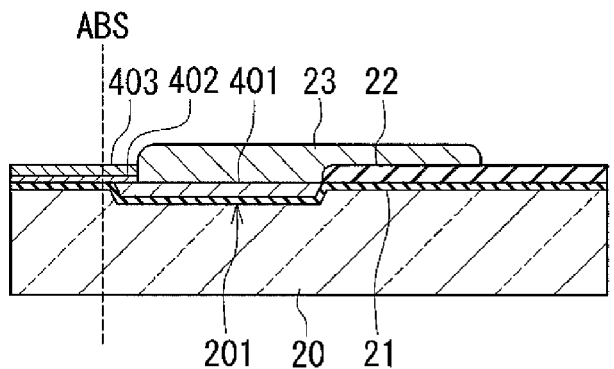
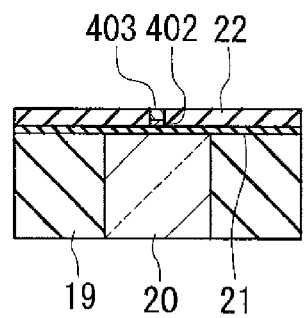
FIG. 11A
FIG. 11B
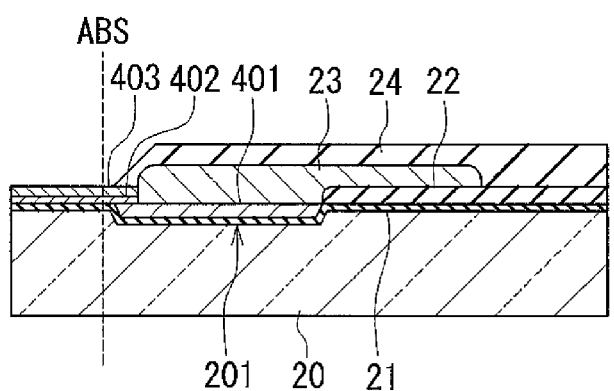
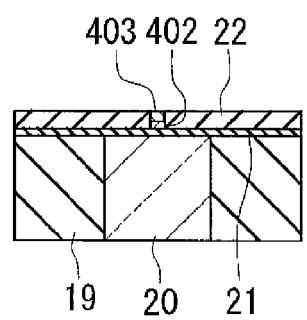
FIG. 12A
FIG. 12B

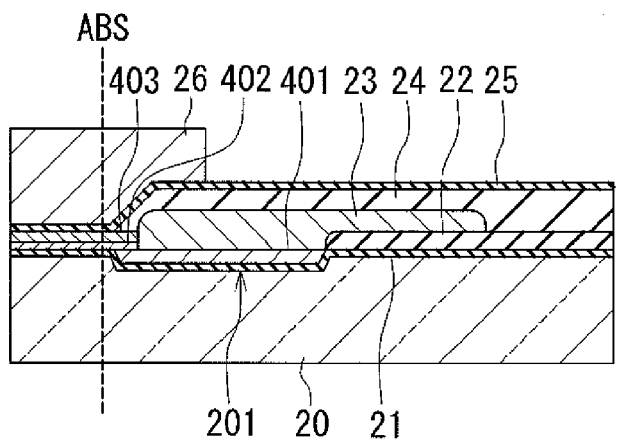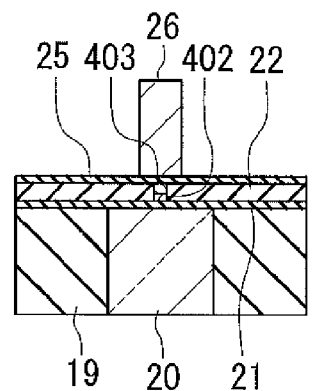
FIG. 13A  FIG. 13B
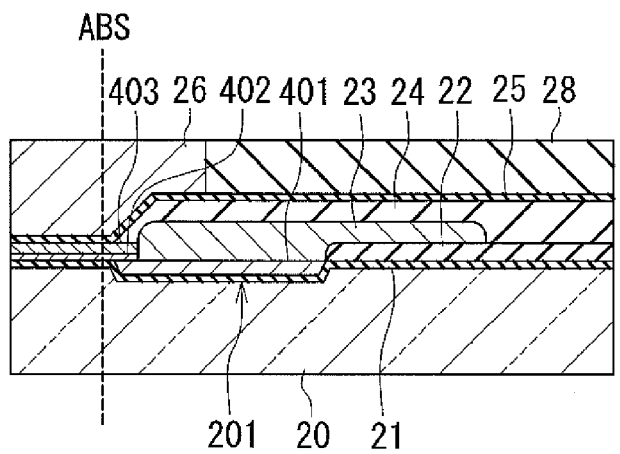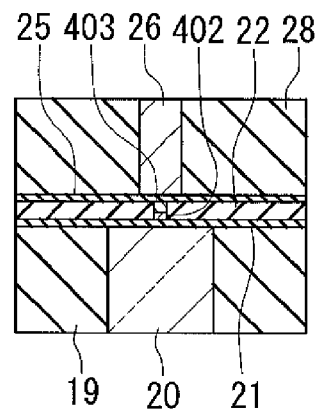
FIG. 14A  FIG. 14B

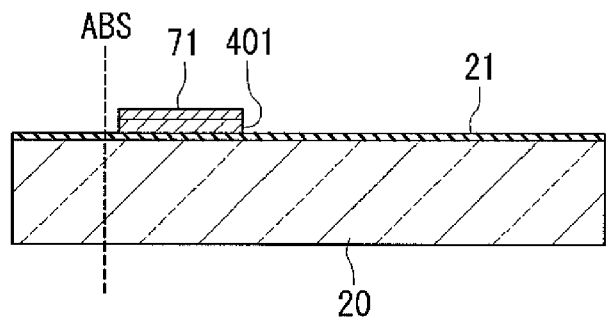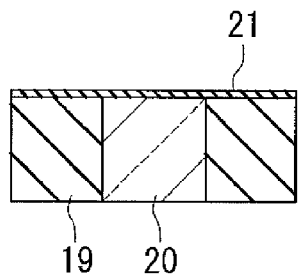
FIG. 20A  FIG. 20B
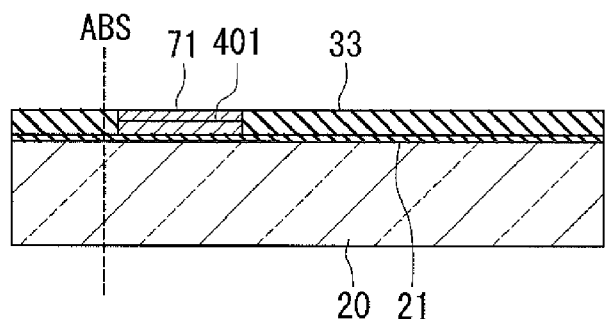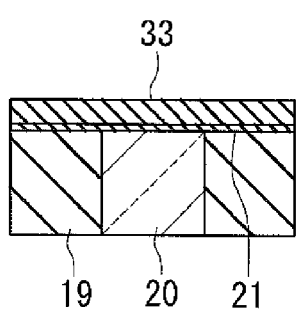
FIG. 21A  FIG. 21B
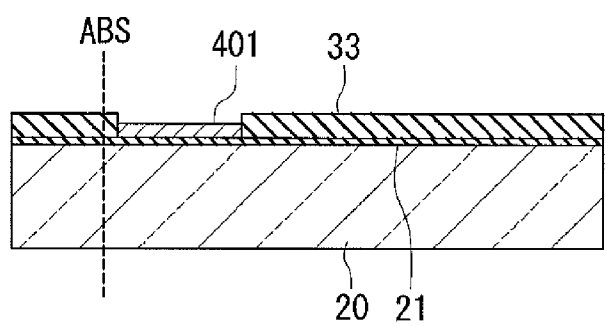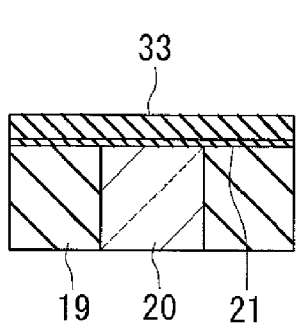
FIG. 22A  FIG. 22B

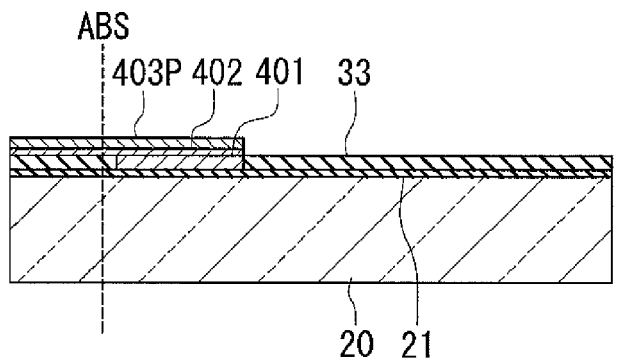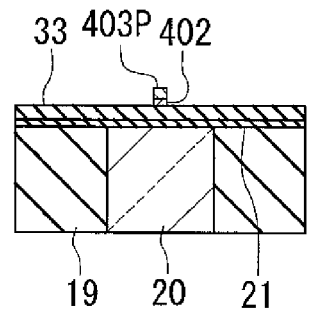
FIG. 23A　　　　　　　FIG. 23B
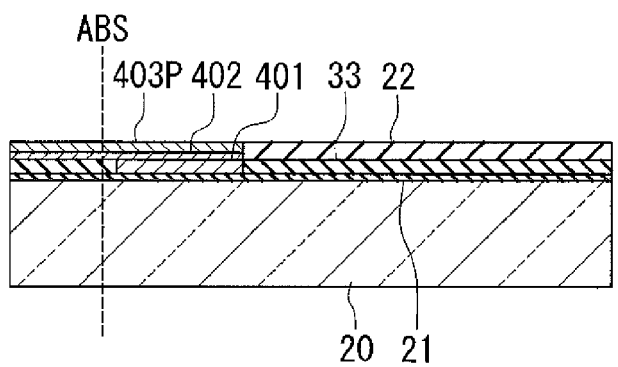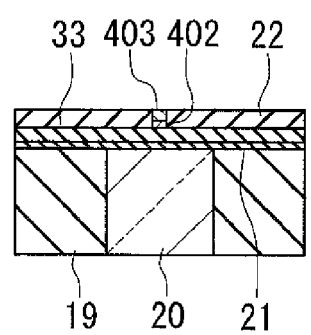
FIG. 24A　　　　　　　FIG. 24B
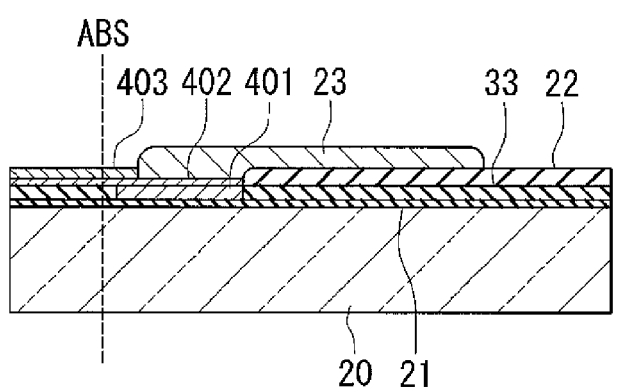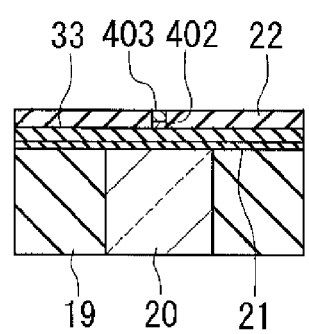
FIG. 25A　　　　　　　FIG. 25B

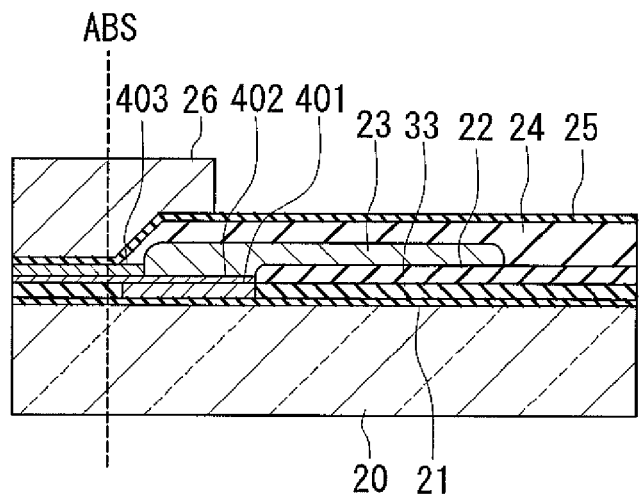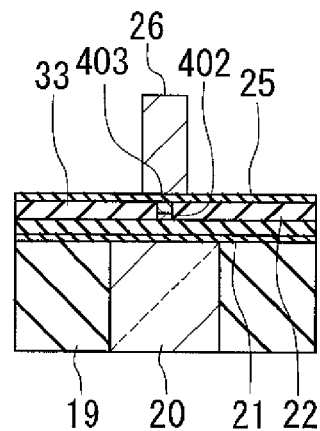
FIG. 26A     FIG. 26B
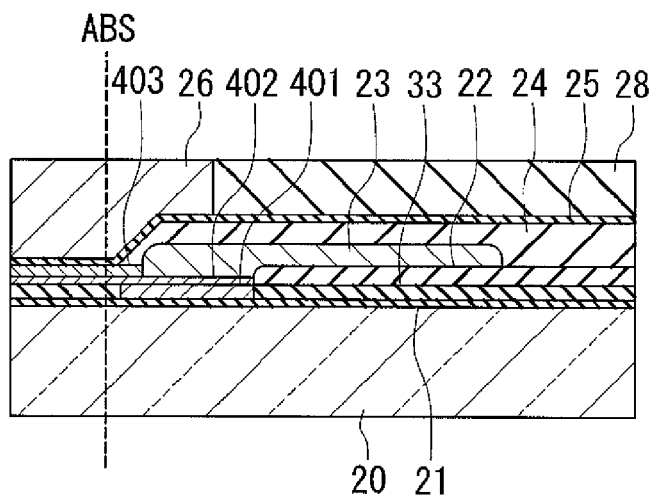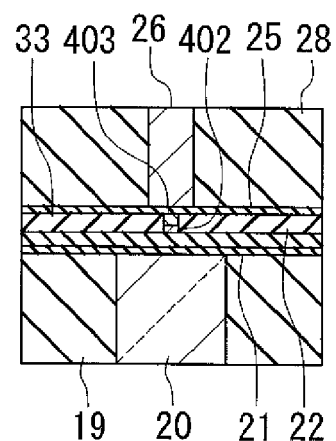
FIG. 27A     FIG. 27B

PLASMON GENERATOR INCLUDES THREE METAL LAYERS FOR THERMALLY-ASSISTED MAGNETIC RECORDING

BACKGROUND OF THE INVENTION

1. Field of the Invention

The present invention relates to a plasmon generator for use in thermally-assisted magnetic recording where a recording medium is irradiated with near-field light to lower the coercivity of the recording medium for data writing, and to a thermally-assisted magnetic recording head including the plasmon generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagating through the waveguide is used to excite surface plasmons on the metallic structure, so that near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, if a plasmon generator is formed entirely of Au or Ag, there are problems as described below.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. If the plasmon generator is formed entirely of Au or Ag, which are relatively soft, the polishing and etching mentioned above may cause the front end face of the plasmon generator to be greatly recessed relative to the other parts of the medium facing surface. This makes the front end face of the plasmon generator distant from the recording medium, and thus degrades the heating performance of the plasmon generator.

Part of the energy of light guided to the plasmon generator through the waveguide is transformed into heat in the plasmon generator. Part of the energy of near-field light generated by the plasmon generator is also transformed into heat in the plasmon generator. The plasmon generator thus increases in temperature during the operation of the thermally-assisted magnetic recording head. A plasmon generator that is formed entirely of Au or Ag will expand and greatly protrude toward the recording medium when the temperature of the plasmon generator increases. As a result, a protective film covering the medium facing surface may come into contact with the recording medium. This may cause damage to the recording medium or cause the protective film to be broken. When the protective film is broken, the plasmon generator may be broken by contact with the recording medium or may be corroded by contact with high temperature air.

Further, a plasmon generator that is formed entirely of Au or Ag may be deformed due to aggregation when its temperature increases. In addition, such a plasmon generator expands when its temperature increases and then contracts when its temperature decreases. When the plasmon generator undergoes such a process, the front end face of the plasmon generator may be greatly recessed relative to the other parts of the medium facing surface. In such a case, the heating performance of the plasmon generator is degraded as mentioned above.

For the various reasons described above, a plasmon generator formed entirely of Au or Ag has the drawback of being low in reliability.

U.S. Patent Application Publication No. 2011/0170381 A1 discloses a metallic structure composed of a main body and a layer having a greater hardness than the main body (this layer will hereinafter be referred to as the hard layer). In this metallic structure, the main body is not exposed in the medium facing surface, but the hard layer is exposed in the medium facing surface. In this metallic structure, surface plasmons are generated in the main body. The generated surface plasmons propagate to the hard layer, and near-field light is generated from the vertex of the hard layer. This metallic structure has the drawback that there is a great loss of the surface plasmons as they propagate from the main body to the hard layer, and it is thus difficult to allow the surface plasmons to efficiently propagate to the vertex.

OBJECT AND SUMMARY OF THE INVENTION

It is an object of the present invention to provide a plasmon generator of high reliability that allows surface plasmons to propagate to the front end face efficiently, and to provide a thermally-assisted magnetic recording head having such a plasmon generator.

A plasmon generator of the present invention has a front end face. Further, the plasmon generator of the present invention includes a first layer formed of a first metal material, a second layer formed of a second metal material, and a third layer formed of a third metal material. The first to third layers are stacked to be aligned in this order in a first direction. Each of the first to third layers has a thickness in the first direction. The thickness of the second layer is smaller than the thickness of each of the first and third layers. Each of the second and third layers has an end portion, the end portion lying at an end in a second direction orthogonal to the first direction and constituting part of the front end face. The first layer does not have any portion constituting part of the front end face. The first and second metal materials are higher in electrical conductivity than the third metal material. The third metal material is higher in Vickers hardness than the first and second metal materials. The first layer has a plasmon exciting part configured to excite a surface plasmon thereon through coupling with evanescent light generated from a core through which light propagates. The front end face generates near-field light based on the surface plasmon.

A thermally-assisted magnetic recording head of the present invention includes: a medium facing surface facing a recording medium; a main pole that produces a write magnetic field for writing data on the recording medium; a waveguide; and a plasmon generator. The waveguide includes a core through which light propagates, and a cladding provided around the core. The plasmon generator has a front end face located in the medium facing surface.

In the thermally-assisted magnetic recording head of the present invention, the plasmon generator includes a first layer formed of a first metal material, a second layer formed of a second metal material, and a third layer formed of a third metal material. The first to third layers are stacked to be aligned in this order in a first direction. Each of the first to third layers has a thickness in the first direction. The thickness of the second layer is smaller than the thickness of each of the first and third layers. Each of the second and third layers has an end portion, the end portion lying at an end in a second direction orthogonal to the first direction and constituting part of the front end face. The first layer does not have any portion constituting part of the front end face. The first and second metal materials are higher in electrical conductivity than the third metal material. The third metal material is higher in Vickers hardness than the first and second metal materials. The first layer has a plasmon exciting part configured to excite a surface plasmon thereon through coupling with evanescent light generated from the core. The front end face generates near-field light based on the surface plasmon.

In the plasmon generator and the thermally-assisted magnetic recording head of the present invention, the second metal material may be different from the first metal material.

In the plasmon generator and the thermally-assisted magnetic recording head of the present invention, the thickness of the first layer may be in the range of 40 to 300 nm, the thickness of the second layer may be in the range of 1 to 100 nm, and the thickness of the third layer may be in the range of 10 to 100 nm.

In the plasmon generator and the thermally-assisted magnetic recording head of the present invention, the first layer may have an end face lying at an end in the second direction and being closest to the front end face. This end face may form an angle in the range of 45° to 85° relative to the interface between the first layer and the second layer.

Further, in the thermally-assisted magnetic recording head of the present invention, the core may have an evanescent light generating surface that generates evanescent light based on the light propagating through the core, and the cladding may have an interposition part interposed between the evanescent light generating surface and the plasmon exciting part. The core may have a recess, and at least part of the first layer may be accommodated in the recess.

According to the present invention, it is possible to provide a plasmon generator of high reliability that allows surface plasmons to propagate to the front end face efficiently, and to provide a thermally-assisted magnetic recording head having such a plasmon generator.

Other and further objects, features and advantages of the present invention will appear more fully from the following description.

BRIEF DESCRIPTION OF THE DRAWINGS

FIG. 7A and FIG. 7B are cross-sectional views showing a step of a method of manufacturing the thermally-assisted magnetic recording head according to the first embodiment of the invention.

FIG. 8A and FIG. 8B are cross-sectional views showing a step that follows the step shown in FIG. 7A and FIG. 7B.

FIG. 9A and FIG. 9B are cross-sectional views showing a step that follows the step shown in FIG. 8A and FIG. 8B.

FIG. 10A and FIG. 10B are cross-sectional views showing a step that follows the step shown in FIG. 9A and FIG. 9B.

FIG. 11A and FIG. 11B are cross-sectional views showing a step that follows the step shown in FIG. 10A and FIG. 10B.

FIG. 12A and FIG. 12B are cross-sectional views showing a step that follows the step shown in FIG. 11A and FIG. 11B.

FIG. 13A and FIG. 13B are cross-sectional views showing a step that follows the step shown in FIG. 12A and FIG. 12B.

FIG. 14A and FIG. 14B are cross-sectional views showing a step that follows the step shown in FIG. 13A and FIG. 13B.

FIG. 20A and FIG. 20B are cross-sectional views showing a step of a method of manufacturing the thermally-assisted magnetic recording head according to the second embodiment of the invention.

FIG. 21A and FIG. 21B are cross-sectional views showing a step that follows the step shown in FIG. 20A and FIG. 20B.

FIG. 22A and FIG. 22B are cross-sectional views showing a step that follows the step shown in FIG. 21A and FIG. 21B.

FIG. 23A and FIG. 23B are cross-sectional views showing a step that follows the step shown in FIG. 22A and FIG. 22B.

FIG. 24A and FIG. 24B are cross-sectional views showing a step that follows the step shown in FIG. 23A and FIG. 23B.

FIG. 25A and FIG. 25B are cross-sectional views showing a step that follows the step shown in FIG. 24A and FIG. 24B.

FIG. 26A and FIG. 26B are cross-sectional views showing a step that follows the step shown in FIG. 25A and FIG. 25B.

FIG. 27A and FIG. 27B are cross-sectional views showing a step that follows the step shown in FIG. 26A and FIG. 26B.

DETAILED DESCRIPTION OF THE PREFERRED EMBODIMENTS

First Embodiment

Figure 5:
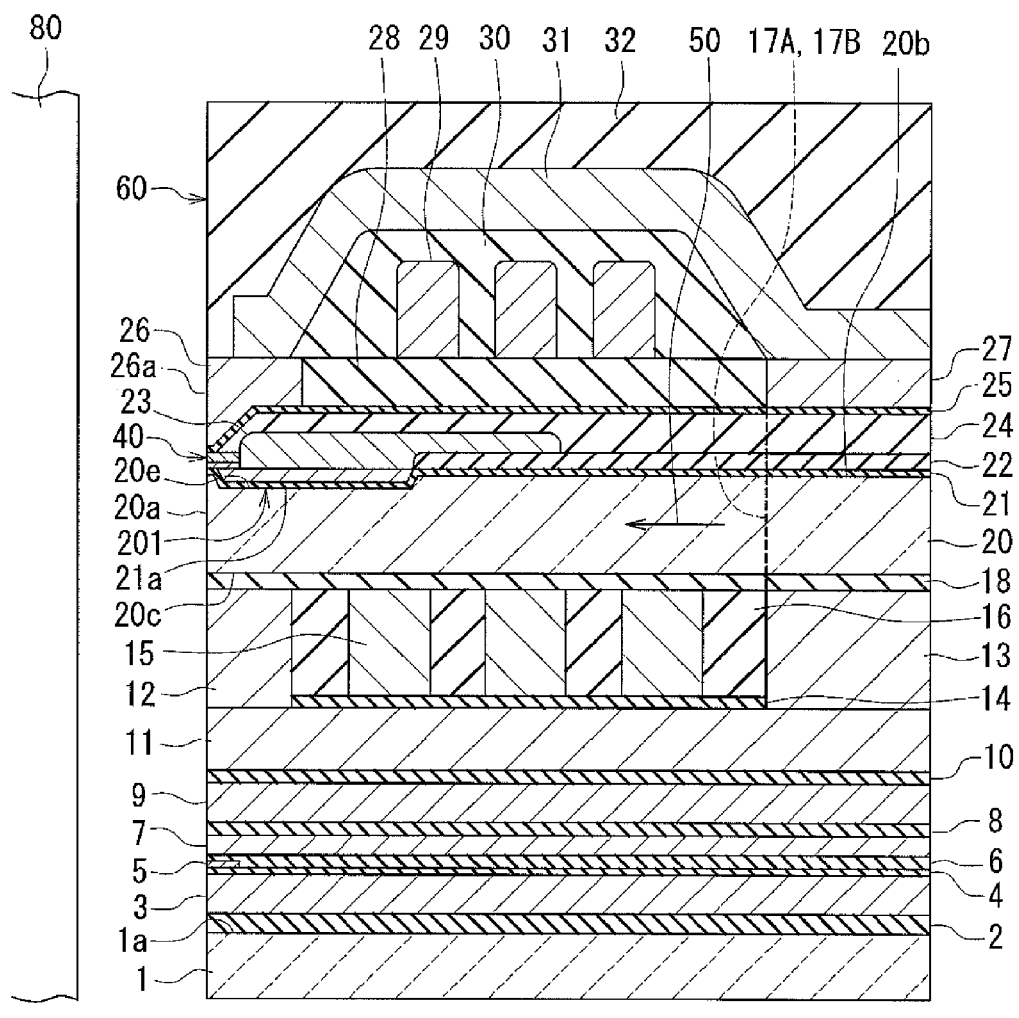
FIG. 5 is a cross-sectional view showing the configuration of the thermally-assisted magnetic recording head according to the first embodiment of the invention.
Figure 6:
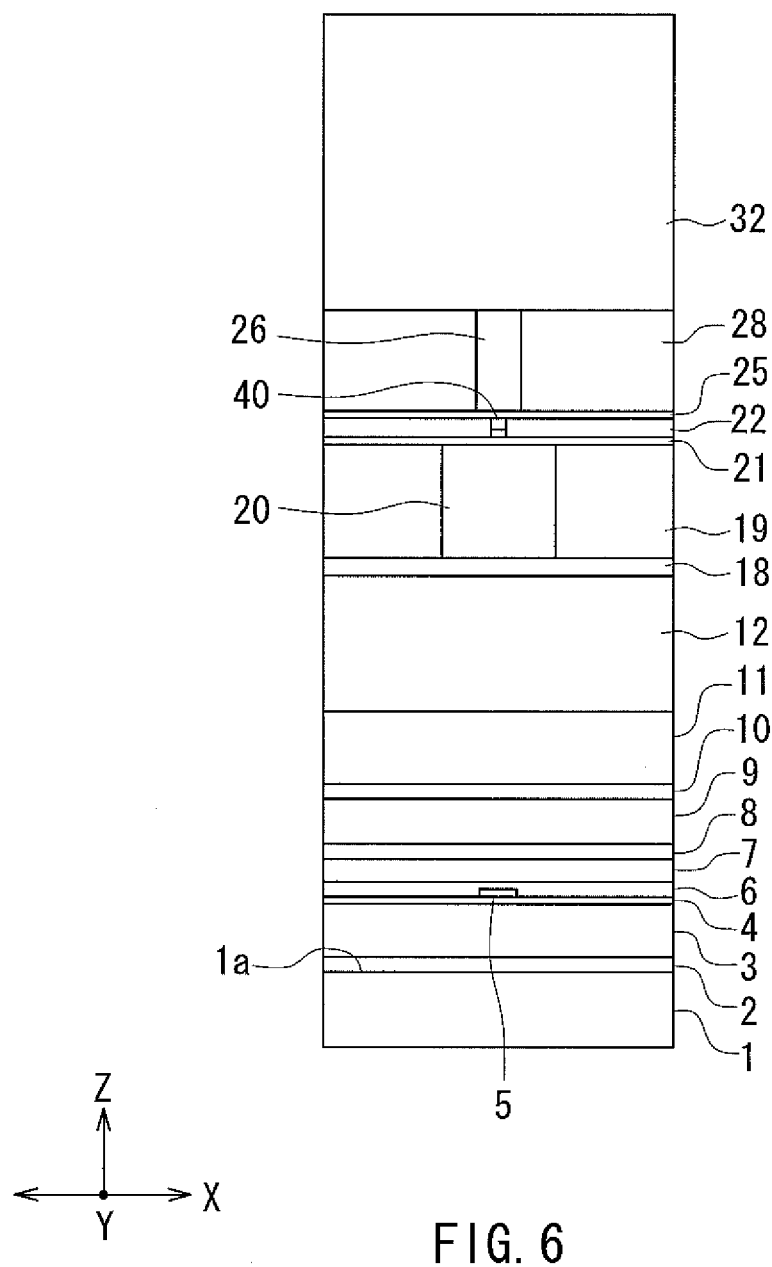
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. The thermally-assisted magnetic recording head according to the present embodiment includes a plasmon generator according to the present embodiment. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 formed of a magnetic material and disposed on the insulating layer 8, and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes a shield layer 12 located near the medium facing surface 60 and lying on a part of the return pole layer 11, a coupling layer 13 located away from the medium facing surface 60 and lying on another part of the return pole layer 11, an insulating layer 14 lying on the remaining part of the return pole layer 11 and on the non-illustrated insulating layer, and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B has a first layer located on the coupling layer 13, and a second and a third layer stacked in this order on the first layer. The first layer of the coupling portion 17A and the first layer of the coupling portion 17B are disposed to be aligned in the track width direction (the X direction). The insulating layer 16 is formed of alumina, for example.

The thermally-assisted magnetic recording head further includes a waveguide. The waveguide includes a core 20 through which light propagates, and a cladding provided around the core 20. The core 20 will be described in detail later.

The cladding includes cladding layers 18, 19, and 21. The cladding layer 18 is disposed over the shield layer 12, the coupling layer 13, the coil 15, and the insulating layer 16. The core 20 is disposed on the cladding layer 18. The cladding layer 19 is disposed on the cladding layer 18 and surrounds the core 20. The cladding layer 21 is disposed over the core 20 and the cladding layer 19.

The core 20 is formed of a dielectric material that transmits laser light to be used for generating near-field light. The laser light emitted from a laser diode (not illustrated) enters the core 20 and propagates through the core 20. The cladding layers 18, 19, and 21 are each formed of a dielectric material that has a refractive index lower than that of the core 20. For example, the core 20 may be formed of tantalum oxide such as $Ta_2O_5$ or silicon oxynitride (SiON), while the cladding layers 18, 19, and 21 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), each being at a distance from the core 20.

The thermally-assisted magnetic recording head further includes a main pole 26 disposed above the core 20 in the vicinity of the medium facing surface 60, and a plasmon generator 40 interposed between the core 20 and the main pole 26. The plasmon generator 40 is configured to excite surface plasmons on the principle to be described later. The plasmon generator 40 will be described in detail later.

The main pole 26 has an end face 26a located in the medium facing surface 60. The main pole 26 may include a narrow portion having the end face 26a and an end portion opposite to the end face 26a, and a wide portion connected to the end portion of the narrow portion. The wide portion is greater than the narrow portion in width in the track width direction (the X direction).

The thermally-assisted magnetic recording head further includes a dielectric layer 22 lying on the cladding layer 21 and surrounding the plasmon generator 40, a heat sink 23 lying astride part of the plasmon generator 40 and part of the dielectric layer 22, a dielectric layer 24 disposed to cover the heat sink 23, and a dielectric layer 25 disposed to cover the plasmon generator 40 and the dielectric layer 24. The maximum thickness of the heat sink 23 is in the range of 200 to 500 nm, for example. The dielectric layer 24 has a top surface, and an end face closest to the medium facing surface 60. The distance from the medium facing surface 60 to an arbitrary point on the aforementioned end face of the dielectric layer 24 decreases with decreasing distance from the arbitrary point to the top surface 1a of the substrate 1. The maximum thickness of the dielectric layer 24 is in the range of 500 to 800 nm, for example.

The main pole 26 is disposed on the dielectric layer 25 so as to lie above part of each of the top surface of the plasmon generator 40, the end face of the dielectric layer 24 and the top surface of the dielectric layer 24. The dielectric layer 25 has a thickness in the range of, for example, 10 to 40 nm, preferably in the range of 15 to 25 nm.

The third layers of the coupling portions 17A and 17B are embedded in the cladding layer 21 and the dielectric layers 22, 24, and 25. The dielectric layers 22, 24, and 25 may be formed of $SiO_2$ or alumina, for example. The heat sink 23 is formed of a material having a high thermal conductivity, such as Au, Ag, Al, or Cu. The heat sink 23 has the function of dissipating heat generated at the plasmon generator 40. The heat sink 23 is not an essential component of the thermally-assisted magnetic recording head, and can be dispensed with.

The thermally-assisted magnetic recording head further includes a coupling layer 27 formed of a magnetic material and disposed over the third layers of the coupling portions 17A and 17B and the dielectric layer 25, and a dielectric layer 28 disposed around the main pole 26 and the coupling layer 27. The top surfaces of the main pole 26, the coupling layer 27, and the dielectric layer 28 are even with each other. The dielectric layer 28 is formed of alumina, for example.

The thermally-assisted magnetic recording head further includes a coil 29 disposed on the dielectric layer 28, an insulating layer 30 disposed to cover the coil 29, and a yoke layer 31 formed of a magnetic material and disposed over the main pole 26, the coupling layer 27 and the insulating layer 30. The yoke layer 31 magnetically couples the main pole 26 and the coupling layer 27 to each other. The coil 29 is planar spiral-shaped and wound around a part of the yoke layer 31 that lies on the coupling layer 27. The coil 29 is formed of a conductive material such as copper. The insulating layer 30 is formed of alumina, for example.

The thermally-assisted magnetic recording head further includes a protective layer 32 disposed to cover the yoke layer 31. The protective layer 32 is formed of alumina, for example.

The parts from the return pole layer 11 to the yoke layer 31 constitute a write head section. The coils 15 and 29 produce magnetic fields corresponding to data to be written on the recording medium 80. The shield layer 12, the return pole layer 11, the coupling layer 13, the coupling portions 17A and 17B, the coupling layer 27, the yoke layer 31, and the main pole 26 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 26. The main pole 26 allows the magnetic flux corresponding to the magnetic field produced by the coil 15 and the magnetic flux corresponding to the magnetic field produced by the coil 29 to pass, and produces a write magnetic field for writing data on the recording medium 80 by means of a perpendicular magnetic recording system.

As has been described, the thermally-assisted magnetic recording head according to the present embodiment includes the medium facing surface 60, the read head section, and the write head section. The read head section and the write head section are stacked on the substrate 1. The write head section is located on the front side in the direction of travel of the recording medium 80 (the Z direction), i.e., on the trailing side, relative to the read head section.

The thermally-assisted magnetic recording head may include a protective film covering the medium facing surface 60. The protective film is formed of diamond-like-carbon (DLC) or $Ta_2O_5$, for example. The protective film is not an essential component of the thermally-assisted magnetic recording head and can be dispensed with.

The write head section includes the coils 15 and 29, the main pole 26, the waveguide, and the plasmon generator 40. The waveguide includes the core 20 and the cladding. The cladding includes the cladding layers 18, 19, and 21. The main pole 26 is located on the front side in the direction of travel of the recording medium 80 (the Z direction) relative to the core 20. The plasmon generator 40 is interposed between the core 20 and the main pole 26.

Figure 1:
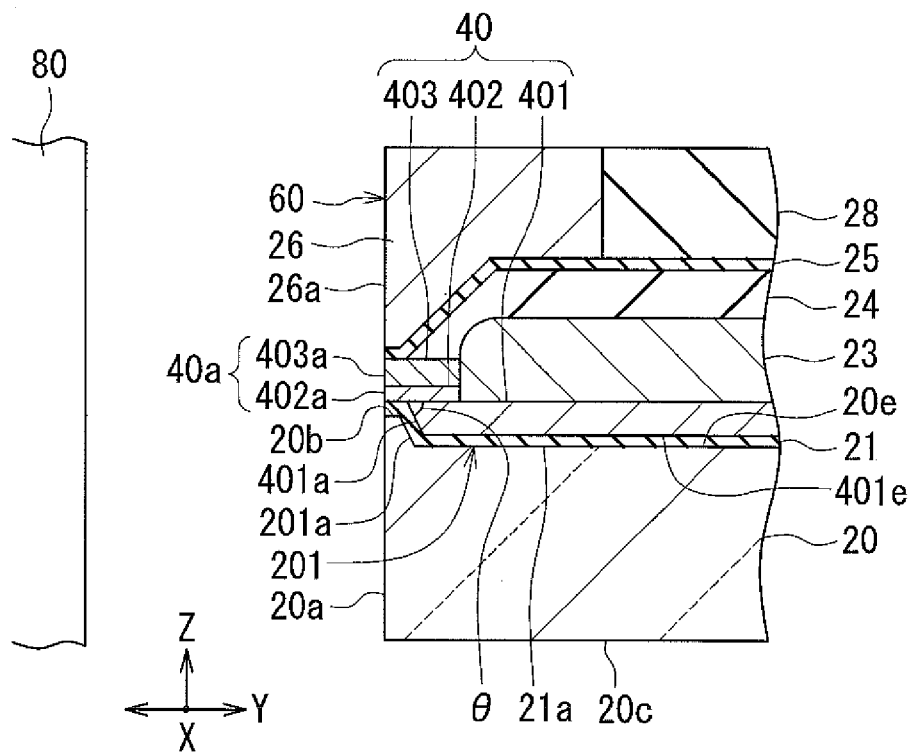
FIG. 1 is a cross-sectional view showing the main part of a thermally-assisted magnetic recording head according to a first embodiment of the invention.
Figure 2:
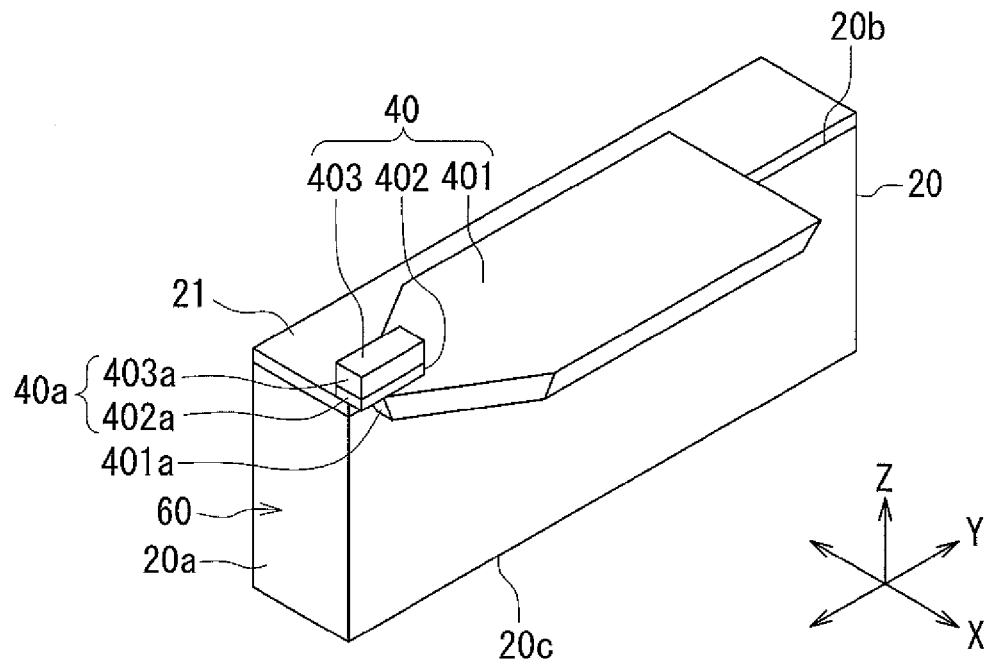
FIG. 2 is a perspective view showing the main part of the thermally-assisted magnetic recording head according to the first embodiment of the invention.
Figure 3:
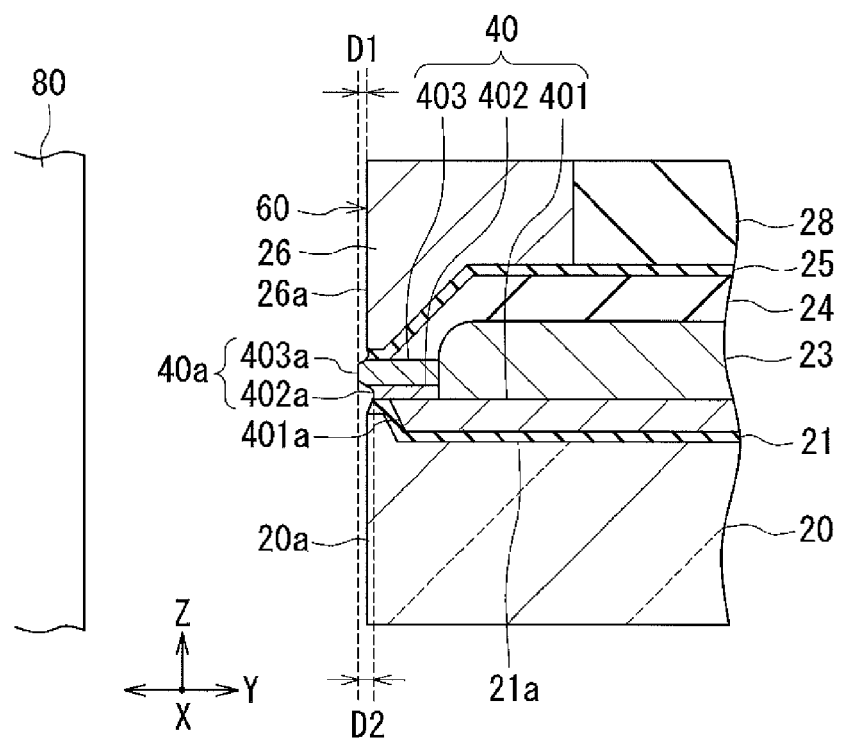
FIG. 3 is a cross-sectional view showing the positional relationship between three layers of the plasmon generator shown in FIG. 1.
Figure 4:
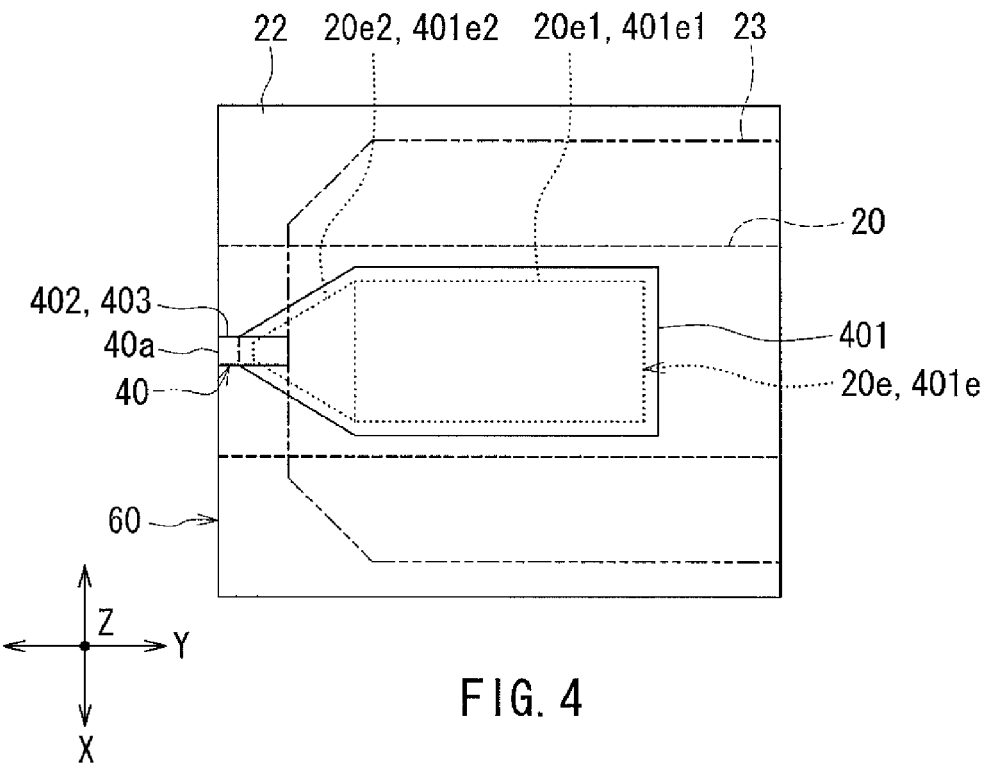
FIG. 4 is a plan view showing the positional relationship between the plasmon generator and the core of the waveguide shown in FIG. 1.

The core 20 and the plasmon generator 40 will now be described in detail with reference to FIG. 1 to FIG. 4. FIG. 1 is a cross-sectional view showing the main part of the thermally-assisted magnetic recording head according to the present embodiment. FIG. 2 is a perspective view showing the main part of the thermally-assisted magnetic recording head according to the present embodiment. Note that FIG. 2 omits some portions of the core 20. FIG. 3 is a cross-sectional view showing the positional relationship between three layers of the plasmon generator 40 shown in FIG. 1. FIG. 4 is a plan view showing the positional relationship between the plasmon generator 40 and the core 20 of the waveguide shown in FIG. 1.

As shown in FIG. 1 and FIG. 5, the core 20 has an end face 20a located in the medium facing surface 60, a top surface 20b, a bottom surface 20c, and two side surfaces. Further, the core 20 has a recess 201 that opens in the top surface 20b. The recess 201 is located near the end face 20a. The cladding layer 21 covers the top surface 20b and the recess 201 of the core 20.

The core 20 has an evanescent light generating surface 20e that generates evanescent light based on the light propagating through the core 20. In the present embodiment, the evanescent light generating surface 20e is formed by the bottom surface of the recess 201. The evanescent light generating surface 20e is perpendicular to the Z direction, for example. In the present embodiment, the evanescent light generating surface 20e has a hexagonal shape. In FIG. 4 the shape of the evanescent light generating surface 20e is shown by dotted lines. The evanescent light generating surface 20e includes a constant width portion 20e1, and a width changing portion 20e2 located between the constant width portion 20e1 and the medium facing surface 60. The constant width portion 20e1 is constant in width in the X direction. The width of the width changing portion 20e2 in the X direction is equal to the width of the constant width portion 20e1 at the boundary between the constant width portion 20e1 and the width changing portion 20e2, and decreases toward the medium facing surface 60.

The recess 201 has six wall faces connecting the evanescent light generating surface 20e and the top surface 20b of the core 20 to each other. A wall face 201a is one of the six wall faces that is closest to the medium facing surface 60. The wall face 201a may be perpendicular to the Y direction or inclined relative to the XZ plane. Where the wall face 201a is inclined relative to the XZ plane, the distance from the medium facing surface 60 to an arbitrary point on the wall face 201a decreases with decreasing distance from the arbitrary point to the top surface 20b of the core 20. FIG. 1 shows an example in which the wall face 201a is inclined relative to the XZ plane.

As shown in FIG. 1 and FIG. 2, the plasmon generator 40 has a front end face 40a located in the medium facing surface 60. The front end face 40a generates near-field light on the principle to be described later. Further, the plasmon generator 40 includes a first layer 401 formed of a first metal material, a second layer 402 formed of a second metal material, and a third layer 403 formed of a third metal material. The first to third layers 401, 402, and 403 are stacked to be aligned in this order in the Z direction. The Z direction corresponds to the first direction in the present invention.

Each of the first to third layers 401, 402, and 403 has a thickness in the Z direction. The thickness of the second layer 402 is smaller than the thickness of each of the first layer 401 and the third layer 403.

The thickness of the first layer 401 is in the range of, for example, 40 to 300 nm, preferably in the range of 100 to 200 nm. The thickness of the second layer 402 is in the range of, for example, 1 to 100 nm, preferably in the range of 5 to 20 nm. The thickness of the third layer 403 is in the range of, for example, 10 to 100 nm, preferably in the range of 30 to 60 nm.

The second and third layers 402 and 403 have end portions 402a and 403a, respectively. Each of the end portions 402a and 403a lies at an end in the Y direction orthogonal to the Z direction, and constitutes part of the front end face 40a. The Y direction corresponds to the second direction in the present invention. The first layer 401 does not have any portion constituting part of the front end face 40a.

At least part of the first layer 401 is accommodated in the recess 201 of the core 20 with the cladding layer 21 interposed between the first layer 401 and the core 20. In the present embodiment, most part of the first layer 401 is accommodated in the recess 201, and the top surface of the first layer 401 projects to a level higher than the top surface 20b of the core 20 by the thickness of the cladding layer 21. The top surface of a part of the cladding layer 21 that lies on the top surface 20b of the core 20 is even with the top surface of the first layer 401.

The second layer 402 lies astride part of the top surface of the first layer 401 and part of the top surface of the cladding layer 21. The third layer 403 lies on the top surface of the second layer 402. The heat sink 23 is in contact with another part of the top surface of the first layer 401.

The first and second metal materials are higher in electrical conductivity than the third metal material. The third metal material is higher in Vickers hardness than the first and second metal materials. The third metal material is different from the first and second metal materials. The first metal material and the second metal material may be the same or different. Each of the first and second metal materials may be one of Au, Ag, Al, Cu, and Ni, for example. The third metal material may be one of Ru, Ni, NiCr, Ta, W, Mo, and Pt, for example. Ni can be any of the first to third metal materials. Where at least one of the first and second metal materials is Ni, the third metal material has a lower electrical conductivity and a higher Vickers hardness than those of Ni. On the other hand, where the third metal material is Ni, each of the first and second metal materials has a higher electrical conductivity and a lower Vickers hardness than those of Ni. Where the first metal material and the second metal material are different, for example, the first metal material may be Au or Ag, while the second metal material may be one of Au, Al, Cu, and Ni (Au is excluded when the first metal material is Au).

The first layer 401 has a plasmon exciting part 401e formed by the bottom surface of the first layer 401. The plasmon exciting part 401e faces the evanescent light generating surface 20e with a predetermined distance therebetween. The cladding layer 21 includes an interposition part 21a interposed between the evanescent light generating surface 20e and the plasmon exciting part 401e. Since the cladding layer 21 is part of the cladding, the cladding can be said to include the interposition part 21a. The distance between the plasmon exciting part 401e and the evanescent light generating surface 20e, that is, the thickness of the interposition part 21a, is in the range of 10 to 100 nm, for example, and preferably falls within the range of 15 to 50 nm.

The plasmon exciting part 401e has a hexagonal shape like the evanescent light generating surface 20e. In FIG. 4, the dotted lines showing the shape of the evanescent light generating surface 20e also show the shape of the plasmon exciting part 401e. The plasmon exciting part 401e includes a constant width portion 401e1, and a width changing portion 401e2 located between the constant width portion 401e1 and the medium facing surface 60. The constant width portion 401e1 is constant in width in the X direction. The width of the width changing portion 401e2 in the X direction is equal to the width of the constant width portion 401e1 at the boundary between the constant width portion 401e1 and the width changing portion 401e2, and decreases toward the medium facing surface 60.

The first layer 401 has an end face 401a that lies at an end in the Y direction and is closest to the medium facing surface 60 and the front end face 40a. The end face 401a is not exposed in the medium facing surface 60. The end face 401a is opposed to the wall face 201a of the recess 201 of the core 20 with the cladding layer 21 interposed therebetween. Like the wall face 201a, the end face 401a may be perpendicular to the Y direction or inclined relative to the XZ plane. Where the end face 401a is inclined relative to the XZ plane, the end face 401a forms an angle θ of smaller than 90° relative to the interface between the first layer 401 and the second layer 402. In this case, the distance from the medium facing surface 60 to an arbitrary point on the end face 401a decreases with decreasing distance from the arbitrary point to the second layer 402. FIG. 1 shows an example in which the angle θ is smaller than 90°.

The shape of the front end face 40a of the plasmon generator 40 will now be described with reference to FIG. 1 and FIG. 3. In the present embodiment, the front end face 40a is composed of the end portion 402a of the second layer 402 and the end portion 403a of the third layer 403. The front end face 40a has a width in the range of 5 to 40 nm, for example. The front end face 40a is located in the medium facing surface 60 together with the end face 20a of the core 20 and the end face 26a of the main pole 26.

In the example shown in FIG. 1, the end face 20a of the core 20, the end face 26a of the main pole 26, the end portion 402a of the second layer 402, and the end portion 403a of the third layer 403 are coplanar. However, in the present embodiment there may be a difference in level in the Y direction between the end portion 403a and each of the end faces 20a and 26a, as shown in FIG. 3. FIG. 3 shows an example in which the end faces 20a and 26a are coplanar and there is a difference in level D1 between the end portion 403a and each of the end faces 20a and 26a such that the end portion 403a lies closer to the recording medium 80 as compared with the end faces 20a and 26a. In this case, the difference in level D1 is preferably 2 nm or smaller. Contrary to the example shown in FIG. 3, there may be a difference in level between the end portion 403a and each of the end faces 20a and 26a such that the end portion 403a lies farther from the recording medium 80 as compared with the end faces 20a and 26a. The difference in level in this case is preferably 1 nm or smaller.

Further, as shown in FIG. 3, there may be a difference in level D2 between the end portion 402a and the end portion 403a such that the end portion 402a lies farther from the recording medium 80 as compared with the end portion 403a. In this case, the difference in level D2 is preferably 10 nm or smaller, and more preferably 1 nm or smaller.

Each of the differences in level D1 and D2 can occur during the step of forming the medium facing surface 60 described later, due to differences between materials used for the core 20, the main pole 26, the second layer 402, and the third layer 403.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 5, the laser light 50 propagates through the core 20 toward the medium facing surface 60, and reaches the vicinity of the plasmon generator 40. In the core 20, the laser light 50 is totally reflected at the evanescent light generating surface 20e to generate evanescent light permeating into the interposition part 21a. In the plasmon generator 40, surface plasmons are excited on the plasmon exciting part 401e through coupling with the aforementioned evanescent light. The surface plasmons propagate along the surface of the first layer 401 to reach the second layer 402 and the third layer 403. As a result, the surface plasmons concentrate at the front end face 40a, and near-field light is generated from the front end face 40a based on the surface plasmons.

The near-field light generated from the front end face 40a is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including rows of a plurality pre-head portions, the plurality of pre-head portions becoming individual thermally-assisted magnetic recording heads later; and separating the plurality of pre-head portions from each other by cutting the substructure and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. In the positions of these two openings, the shield layer 12 and the coupling layer 13 are then formed on the return pole layer 11. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, a dielectric layer that later becomes the core 20 is formed over the entire top surface of the stack. The dielectric layer is then etched in part by, for example, reactive ion etching (hereinafter referred to as RIE), and thereby patterned. The planar shape (the shape in a plan view) of the dielectric layer having been patterned is the same as that of the core 20. Next, although not illustrated, the second layers of the coupling portions 17A and 17B are formed on the first layers of the coupling portions 17A and 17B.

Next, the cladding layer 19 is formed over the entire top surface of the stack. The cladding layer 19 is then polished by, for example, CMP, until the dielectric layer and the second layers of the coupling portions 17A and 17B are exposed.

Reference is now made to FIG. 7A through FIG. 14B to describe steps to be performed after the polishing of the cladding layer 19 up to the formation of the dielectric layer 28. FIG. 7A through FIG. 14B each show a stack of layers formed in the process of manufacturing the thermally-assisted magnetic recording head. Note that portions located below the core 20 are omitted from FIG. 7A through FIG. 14B. FIG. 7A to FIG. 14A each show a cross section that intersects the front end face 26a of the main pole 26 and that is perpendicular to the medium facing surface 60 and the top surface 1a of the substrate 1. FIG. 7B to FIG. 14B each show a cross section of the stack taken in the position at which the medium facing surface 60 is to be formed. In FIG. 7A to FIG. 14A, the symbol "ABS" indicates the position at which the medium facing surface 60 is to be formed.

FIG. 7A and FIG. 7B show a step that follows the polishing of the cladding layer 19. In this step, first, the aforementioned dielectric layer to become the core 20 is etched in part by, for example, RIE, to thereby form the recess 201. The dielectric layer thereby becomes the core 20. Next, the cladding layer 21 is formed over the entire top surface of the stack.

FIG. 8A and FIG. 8B show the next step. In this step, first, a metal film that later becomes the first layer 401 is formed over the entire top surface of the stack by sputtering, for example. The metal film is then polished by, for example, CMP, until a portion of the cladding layer 21 that lies on the top surface 20b of the core 20 is exposed. The remainder of the metal film thereby becomes the first layer 401. Next, a metal film 402P and a metal film 403P are formed in succession on the cladding layer 21 and the first layer 401 by sputtering, for example. The metal film 402P later becomes the second layer 402. The metal film 403P later becomes the third layer 403.

FIG. 9A and FIG. 9B show the next step. In this step, first, an etching mask, not illustrated, is formed on the metal film 403P. Using this etching mask, portions of the metal films 402P and 403P are then etched by RIE, for example. The remainder of the metal films 402P and 403P thereby become the second layer 402 and the third layer 403, respectively.

FIG. 10A and FIG. 10B show the next step. In this step, first, the dielectric layer 22 is formed over the entire top surface of the stack. The dielectric layer 22 is then polished by, for example, CMP, until the third layer 403 is exposed.

FIG. 11A and FIG. 11B show the next step. In this step, first, the dielectric layer 22 is selectively etched to form therein an opening for exposing part of the top surface of the first layer 401. Then, the heat sink 23 is formed to be in contact with the part of the top surface of the first layer 401. Part of the heat sink 23 is disposed on part of the dielectric layer 22.

FIG. 12A and FIG. 12B show the next step. In this step, the dielectric layer 24 is formed to cover the heat sink 23.

FIG. 13A and FIG. 13B show the next step. In this step, first, the dielectric layer 25 is formed to cover the dielectric layer 24. The cladding layer 21 and the dielectric layers 22, 24 and 25 are then selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the dielectric layer 25, and the coupling layer 27 is formed on the third layers of the coupling portions 17A and 17B and the dielectric layer 25.

FIG. 14A and FIG. 14B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other.

Now, steps to follow the step of FIG. 14A and FIG. 14B will be described with reference to FIG. 5 and FIG. 6. First, the coil 29 is formed on the dielectric layer 28. The insulating layer 30 is then formed to cover the coil 29. Next, the yoke layer 31 is formed over the main pole 26, the coupling layer 27 and the insulating layer 30. Then, the protective layer 32 is formed to cover the yoke layer 31. Wiring, terminals, and other components are then formed on the top surface of the protective layer 32. When the substructure is completed thus, the step of forming the medium facing surface 60 is performed. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, ion beam etching, after the polishing step.

In the present embodiment, the aforementioned polishing step and etching step included in the step of forming the medium facing surface 60 may cause the differences in level D1 and D2 which have been described with reference to FIG. 3.

The effects of the plasmon generator 40 and the thermally-assisted magnetic recording head according to the present embodiment will now be described. The plasmon generator 40 according to the present embodiment includes the first layer 401 formed of the first metal material, the second layer 402 formed of the second metal material, and the third layer 403 formed of the third metal material. The first layer 401 does not have any portion constituting part of the front end face 40a of the plasmon generator 40. Thus, no portion of the first layer 401 is exposed in the medium facing surface 60. Further, the first metal material forming the first layer 401 is higher in electrical conductivity than the third metal material. Thus, the first metal material can be selected from any metal materials that have high electrical conductivities and are suitable for excitation and propagation of surface plasmons, without the need for considering mechanical strength. This allows appropriate excitation and propagation of surface plasmons on the first layer 401.

The front end face 40a of the plasmon generator 40 is composed of the end portion 402a of the second layer 402 and the end portion 403a of the third layer 403. Since the third layer 403 is greater in thickness than the second layer 402, the end portion 403a of the third layer 403 constitutes the major part of the front end face 40a. The third metal material forming the third layer 403 is higher in Vickers hardness than the first and second metal materials. This makes it possible to prevent the front end face 40a from being greatly recessed relative to the other parts of the medium facing surface 60 in the step of forming the medium facing surface 60. Consequently, according to the present embodiment, it is possible to prevent degradation in heating performance of the plasmon generator 40 that would occur where the front end face 40a is greatly recessed relative to the other parts of the medium facing surface 60.

Further, the present embodiment makes it possible to prevent the third layer 403 from being deformed or broken due to a temperature change of the plasmon generator 40, and also prevent the front end face 40a from being greatly recessed relative to the other parts of the medium facing surface 60 due to a temperature change of the plasmon generator 40.

The second metal material forming the second layer 402 is lower in Vickers hardness than the third metal material forming the third layer 403. However, since the second layer 402 is in contact with the third layer 403 thicker and harder than the second layer 402, the second layer 402 is protected by the third layer 403. This makes it possible to prevent deformation of the second layer 402.

Now, a case will be contemplated in which the plasmon generator 40 does not include the second layer 402. In this case, the first layer 401 and the third layer 403 formed of different materials are in contact with each other, and a difference in level develops between the end face 401a of the first layer 401 and the end portion 403a of the third layer 403. In this case, surface plasmons excited on the plasmon exciting part 401e of the first layer 401 suffer a great loss as they propagate from the first layer 401 to the third layer 403, and it is thus difficult to allow the surface plasmons to efficiently propagate to the front end face 40a.

In contrast, the plasmon generator 40 according to the present embodiment has the second layer 402. Like the first metal material, the second metal material forming the second layer 402 is higher in electrical conductivity than the third metal material. This allows the surface plasmons excited on the plasmon exciting part 401e of the first layer 401 to propagate to the second layer 402 efficiently.

Further, there is no or only a slight difference in level between the end portion 402a of the second layer 402 and the end portion 403a of the third layer 403. Additionally, the thickness of the second layer 402 is smaller than the thickness of each of the first layer 401 and the third layer 403. Thus, it is possible to allow the surface plasmons to efficiently propagate also from the second layer 402 to the third layer 403.

Where the end face 401a of the first layer 401 forms an angle θ of smaller than 90° relative to the interface between the first layer 401 and the second layer 402, the distance from the medium facing surface 60 to an arbitrary point on the end face 401a decreases with decreasing distance from the arbitrary point to the second layer 402. In this case, surface plasmons excited on the plasmon exciting part 401e are able to propagate to the vicinity of the end portion 402a of the second layer 402 through the end face 401a. Further, where the angle θ is smaller than 90°, it is possible to reduce the loss of the surface plasmons as they propagate from the end face 401a of the first layer 401 to the second layer 402 when compared with the case where the angle θ is 90° or greater. Thus, where the angle θ is smaller than 90°, the surface plasmons excited on the plasmon exciting part 401e of the first layer 401 are able to propagate to the second layer 402 more efficiently. The above-described effect obtained where the angle θ is smaller than 90° becomes smaller as the angle θ approaches 90°. On the other hand, if the angle θ is excessively small, it becomes difficult to form the end face 401a. In view of this, the angle θ is preferably in the range of 45° to 85°, and more preferably in the range of 60° to 75°.

As can be seen from the foregoing, according to the present embodiment, it is possible to provide the plasmon generator 40 having high reliability and allowing surface plasmons to propagate to the front end face 40a efficiently, and to provide a thermally-assisted magnetic recording head having the plasmon generator 40.

Second Embodiment

Figure 15:
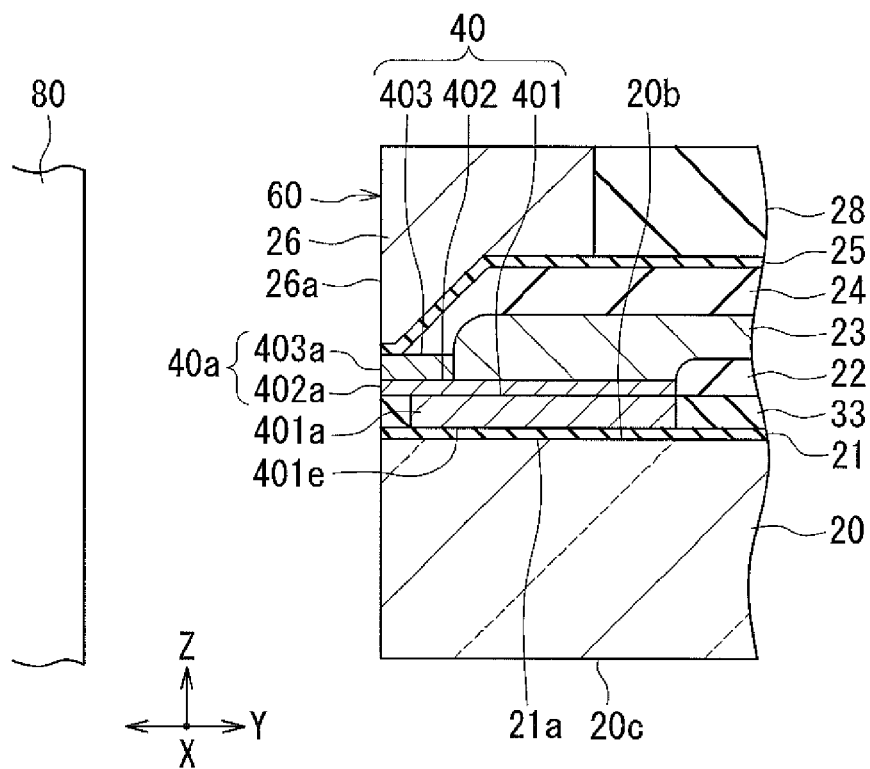
FIG. 15 is a cross-sectional view showing the main part of a thermally-assisted magnetic recording head according to a second embodiment of the invention.
Figure 16:
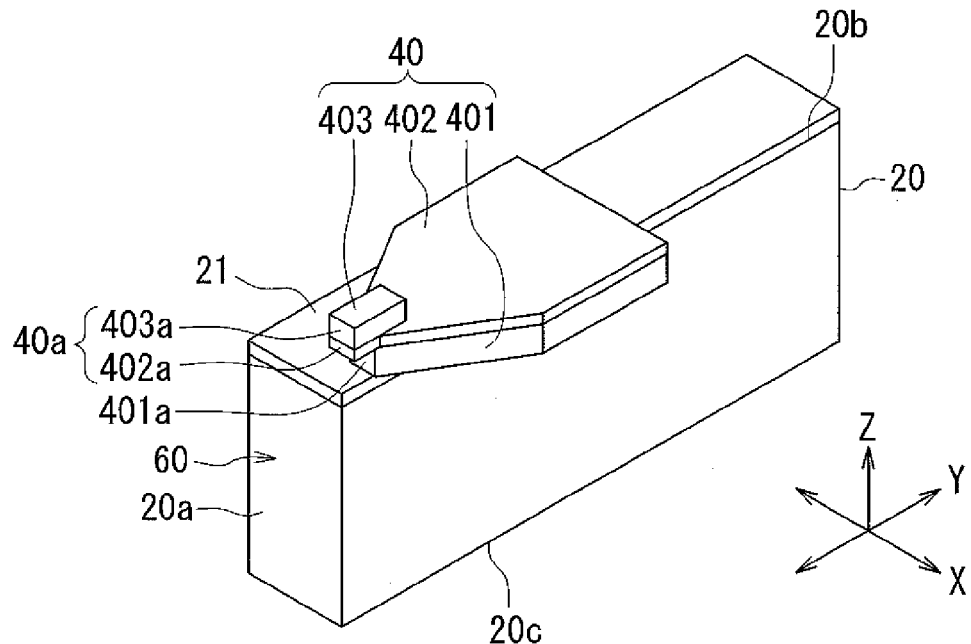
FIG. 16 is a perspective view showing the main part of the thermally-assisted magnetic recording head according to the second embodiment of the invention.
Figure 17:
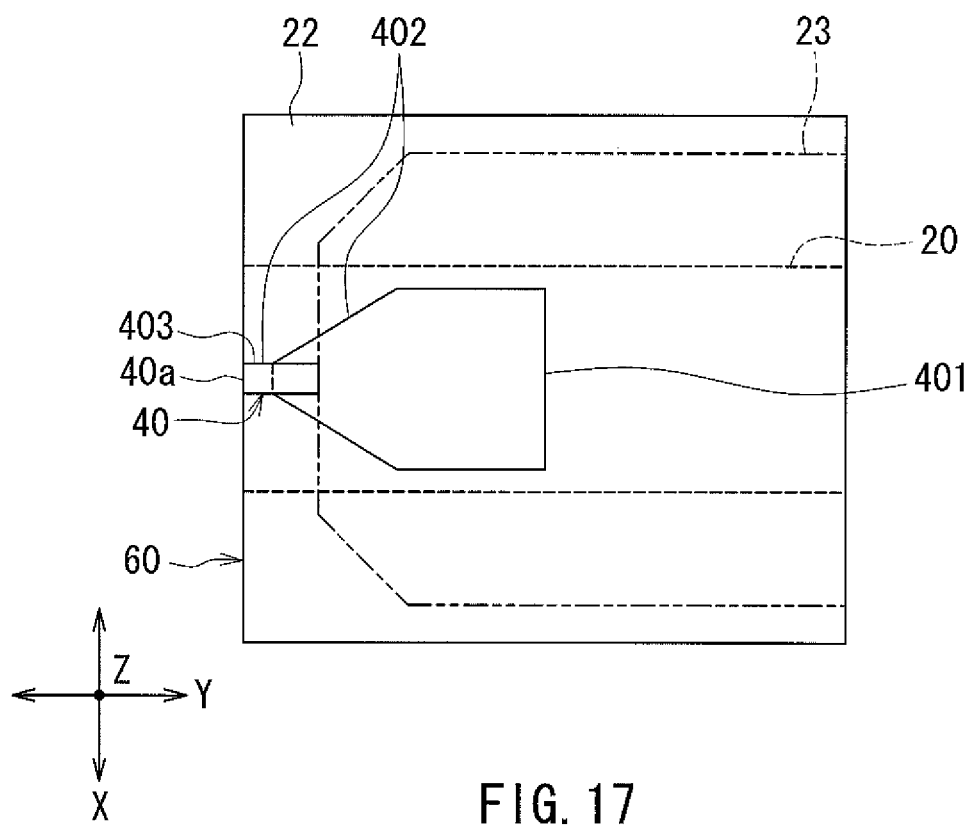
FIG. 17 is a plan view showing the positional relationship between the plasmon generator and the core of the waveguide shown in FIG. 15.
Figure 18:
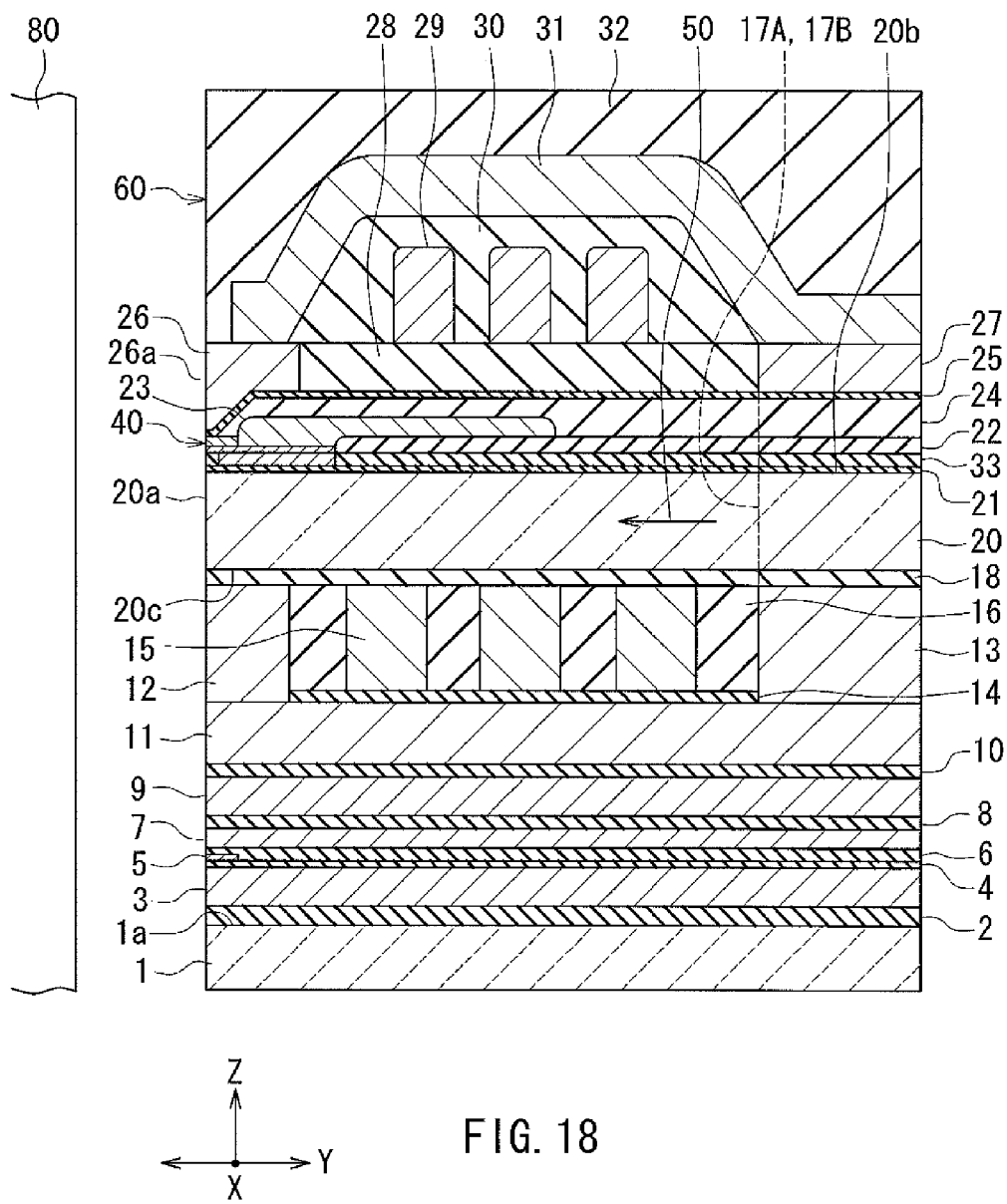
FIG. 18 is a cross-sectional view showing the configuration of the thermally-assisted magnetic recording head according to the second embodiment of the invention.
Figure 19:
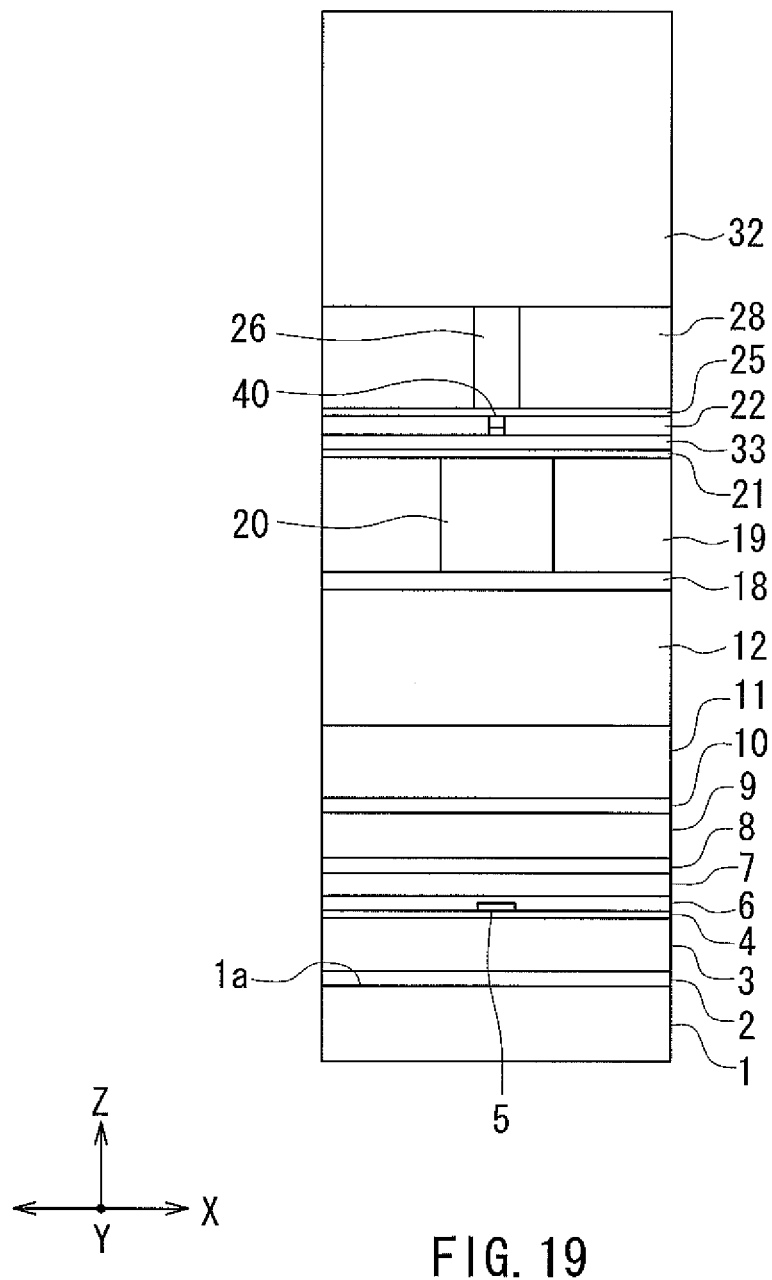
FIG. 19 is a front view showing the medium facing surface of the thermally-assisted magnetic recording head according to the second embodiment of the invention.

A plasmon generator and a thermally-assisted magnetic recording head according to a second embodiment of the invention will now be described. First, reference is made to FIG. 15 to FIG. 19 to describe the configuration of the thermally-assisted magnetic recording head according to the present embodiment. FIG. 15 is a cross-sectional view showing the main part of the thermally-assisted magnetic recording head according to the present embodiment. FIG. 16 is a perspective view showing the main part of the thermally-assisted magnetic recording head according to the present embodiment. Note that FIG. 16 omits some portions of the core 20. FIG. 17 is a plan view showing the positional relationship between the plasmon generator 40 and the core 20 of the waveguide shown in FIG. 15. FIG. 18 is a cross-sectional view showing the configuration of the thermally-assisted magnetic recording head according to the present embodiment. FIG. 19 is a front view showing the medium facing surface of the thermally-assisted magnetic recording head according to the present embodiment.

Now, a description will be given of how the thermally-assisted magnetic recording head according to the present embodiment differs from the thermally-assisted magnetic recording head according to the first embodiment. In the present embodiment, the core 20 does not have the recess 201, and the top surface 20b is flat. In the present embodiment, the top surface 20b is the evanescent light generating surface. The cladding layer 21 covers the top surface 20b of the core 20.

The thermally-assisted magnetic recording head according to the present embodiment includes a plasmon generator 40 according to the present embodiment. The plasmon generator 40 according to the present embodiment includes a first layer 401, a second layer 402, and a third layer 403.

The first layer 401 is located at a distance from the medium facing surface 60 and lies on the cladding layer 21. The thermally-assisted magnetic recording head according to the present embodiment has a dielectric layer 33 lying on the cladding layer 21 and surrounding the first layer 401. The top surfaces of the first layer 401 and the dielectric layer 33 are even with each other. The dielectric layer 33 is formed of SiO$_2$ or alumina, for example. In the present embodiment, the end face 401a of the first layer 401 is perpendicular to the interface between the first layer 401 and the second layer 402.

The second layer 402 lies astride part of the top surface of the dielectric layer 33 and part of the top surface of the first layer 401. The third layer 403 lies on part of the top surface of the second layer 402.

The dielectric layer 22 lies on the dielectric layer 33 and surrounds the second layer 402. The heat sink 23 lies astride part of the second layer 402 and part of the dielectric layer 22.

The remainder of features of the first to third layers 401, 402 and 403 are the same as in the first embodiment.

A method of manufacturing the thermally-assisted magnetic recording head according to the present embodiment will now be described with reference to FIG. 20A through FIG. 27B. FIG. 20A through FIG. 27B each show a stack of layers formed in the process of manufacturing the thermally-assisted magnetic recording head. Note that portions located below the core 20 are omitted from FIG. 20A through FIG. 27B. FIG. 20A to FIG. 27A each show a cross section that intersects the front end face 26a of the main pole 26 and that is perpendicular to the medium facing surface 60 and the top surface 1a of the substrate 1. FIG. 20B to FIG. 27B each show a cross section of the stack taken in the position at which the medium facing surface 60 is to be formed. In FIG. 20A to FIG. 27A, the symbol "ABS" indicates the position at which the medium facing surface 60 is to be formed.

The method of manufacturing the thermally-assisted magnetic recording head according to the present embodiment is the same as the method according to the first embodiment up to the step of polishing the cladding layer 19. In the present embodiment, however, upon patterning of the dielectric layer to become the core 20, the dielectric layer becomes the core 20.

FIG. 20A and FIG. 20B show a step that follows the polishing of the cladding layer 19. In this step, first, the cladding layer 21 is formed over the entire top surface of the stack. Next, a metal film that later becomes the first layer 401 is formed over the entire top surface of the stack by sputtering, for example. An etching mask 71 is then formed on the metal film. Using the etching mask 71, a portion of the metal film is then etched by RIE, for example. The remainder of the metal film thereby becomes the first layer 401.

FIG. 21A and FIG. 21B show the next step. In this step, first, the dielectric layer 33 is formed over the entire top surface of the stack. The dielectric layer 33 is then polished by, for example, CMP, until the etching mask 71 is exposed.

Next, as shown in FIG. 22A and FIG. 22B, the etching mask 71 is removed.

FIG. 23A and FIG. 23B show the next step. In this step, first, the dielectric layer 33 is polished by, for example, CMP, so as to make the top surfaces of the first layer 401 and the dielectric layer 33 even with each other. Next, the second layer 402 and a metal film 403P are formed in succession on the first layer 401 and the dielectric layer 33 by sputtering, for example. The metal film 403P later becomes the third layer 403.

FIG. 24A and FIG. 24B show the next step. In this step, first, the dielectric layer 22 is formed over the entire top surface of the stack. The dielectric layer 22 is then polished by, for example, CMP, until the metal film 403P is exposed.

FIG. 25A and FIG. 25B show the next step. In this step, first, an etching mask, not illustrated, is formed on the metal film 403P. Using this etching mask, a portion of the metal film 403P is then etched by RIE, for example. The remainder of the metal film 403P thereby becomes the third layer 403. Then, the heat sink 23 is formed to be in contact with part of the top surface of the second layer 402. Part of the heat sink 23 is disposed on part of the dielectric layer 22.

FIG. 26A and FIG. 26B show the next step. In this step, first, the dielectric layer 24 is formed to cover the heat sink 23. Next, the dielectric layer 25 is formed to cover the dielectric layer 24. The cladding layer 21 and the dielectric layers 33, 22, 24 and 25 are then selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the dielectric layer 25, and the coupling layer 27 is formed on the third layers of the coupling portions 17A and 17B and the dielectric layer 25.

FIG. 27A and FIG. 27B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other. The subsequent steps are the same as in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the shape of the plasmon generator and the locations of the plasmon generator, the core, and the main pole can be chosen as desired, without being limited to the examples illustrated in the foregoing embodiments. For example, the plasmon generator may be formed by stacking the third layer, the second layer, and the first layer in this order from the bottom, and the core may be disposed above the first layer. In this case, the bottom surface of the core serves as the evanescent light generating surface, and the top surface of the first layer serves as the plasmon exciting part.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A plasmon generator having a front end face and comprising:
   a first layer formed of a first metal material;

a second layer formed of a second metal material; and
a third layer formed of a third metal material, wherein
the first to third layers are stacked to be aligned in this order in a first direction,
each of the first to third layers has a thickness in the first direction,
the thickness of the second layer is smaller than the thickness of each of the first and third layers,
each of the second and third layers has an end portion, the end portion lying at an end in a second direction orthogonal to the first direction and constituting part of the front end face,
the first layer does not have any portion constituting part of the front end face,
the first and second metal materials are higher in electrical conductivity than the third metal material,
the third metal material is higher in Vickers hardness than the first and second metal materials,
the first layer has a plasmon exciting part configured to excite a surface plasmon thereon through coupling with evanescent light generated from a core through which light propagates, and
the front end face generates near-field light based on the surface plasmon.

2. The plasmon generator according to claim 1, wherein the second metal material is different from the first metal material.

3. The plasmon generator according to claim 1, wherein
the thickness of the first layer is in the range of 40 to 300 nm,
the thickness of the second layer is in the range of 1 to 100 nm, and
the thickness of the third layer is in the range of 10 to 100 nm.

4. The plasmon generator according to claim 1, wherein the first layer has an end face lying at an end in the second direction and being closest to the front end face, the end face forming an angle in the range of 45° to 85° relative to an interface between the first layer and the second layer.

5. A thermally-assisted magnetic recording head comprising:
a medium facing surface facing a recording medium;
a main pole that produces a write magnetic field for writing data on the recording medium;
a waveguide including a core through which light propagates, and a cladding provided around the core; and
a plasmon generator having a front end face located in the medium facing surface, the plasmon generator including:
a first layer formed of a first metal material;
a second layer formed of a second metal material; and
a third layer formed of a third metal material, wherein
the first to third layers are stacked to be aligned in this order in a first direction,
each of the first to third layers has a thickness in the first direction,
the thickness of the second layer is smaller than the thickness of each of the first and third layers,
each of the second and third layers has an end portion, the end portion lying at an end in a second direction orthogonal to the first direction and constituting part of the front end face,
the first layer does not have any portion constituting part of the front end face,
the first and second metal materials are higher in electrical conductivity than the third metal material,
the third metal material is higher in Vickers hardness than the first and second metal materials,
the first layer has a plasmon exciting part configured to excite a surface plasmon thereon through coupling with evanescent light generated from the core, and
the front end face generates near-field light based on the surface plasmon.

6. The thermally-assisted magnetic recording head according to claim 5, wherein the second metal material is different from the first metal material.

7. The thermally-assisted magnetic recording head according to claim 5, wherein
the thickness of the first layer is in the range of 40 to 300 nm,
the thickness of the second layer is in the range of 1 to 100 nm, and
the thickness of the third layer is in the range of 10 to 100 nm.

8. The thermally-assisted magnetic recording head according to claim 5, wherein the first layer has an end face lying at an end in the second direction and being closest to the front end face, the end face forming an angle in the range of 45° to 85° relative to an interface between the first layer and the second layer.

9. The thermally-assisted magnetic recording head according to claim 5, wherein
the core has an evanescent light generating surface that generates the evanescent light based on the light propagating through the core, and
the cladding has an interposition part interposed between the evanescent light generating surface and the plasmon exciting part.

10. The thermally-assisted magnetic recording head according to claim 5, wherein
the core has a recess, and
at least part of the first layer is accommodated in the recess.

* * * * *

UNITED STATES PATENT AND TRADEMARK OFFICE
CERTIFICATE OF CORRECTION

| | |
|---|---|
| PATENT NO. | : 8,711,663 B1 |
| APPLICATION NO. | : 13/777488 |
| DATED | : April 29, 2014 |
| INVENTOR(S) | : Yoshitaka Sasaki et al. |

It is certified that error appears in the above-identified patent and that said Letters Patent is hereby corrected as shown below:

On the Title Page, Item (54) and in the Specification, column 1, line 1, title should read:

"PLASMON GENERATOR INCLUDING THREE METAL LAYERS FOR THERMALLY-ASSISTED MAGNETIC RECORDING"

Signed and Sealed this
First Day of July, 2014

Michelle K. Lee
*Deputy Director of the United States Patent and Trademark Office*